Dec. 5, 1967  R. E. HUFFMAN  3,355,838
FLUID PRESSURE CONTROL FOR MODEL AIRCRAFT
Filed June 17, 1965  2 Sheets-Sheet 1
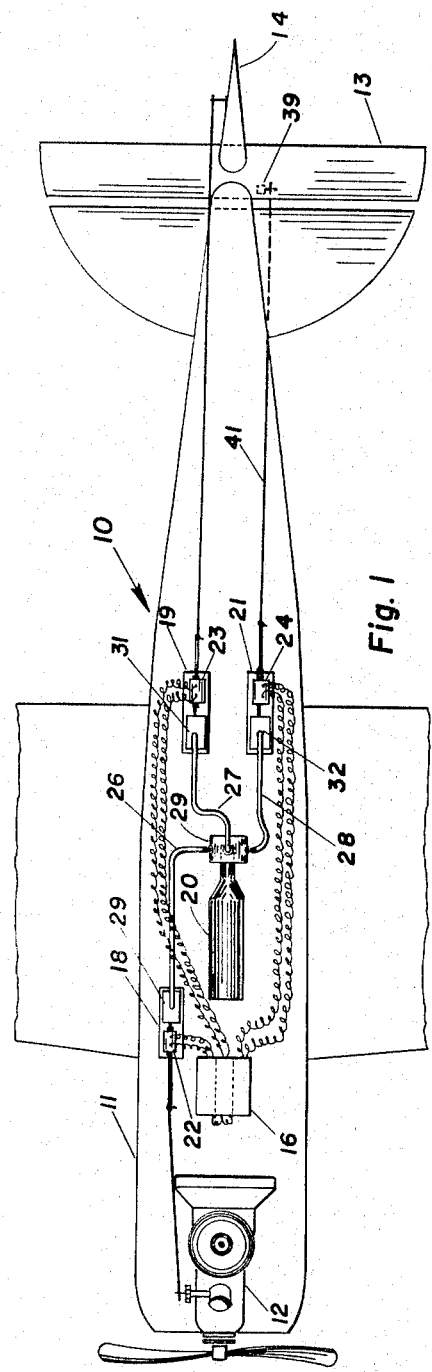
Fig. 1
Fig. 2
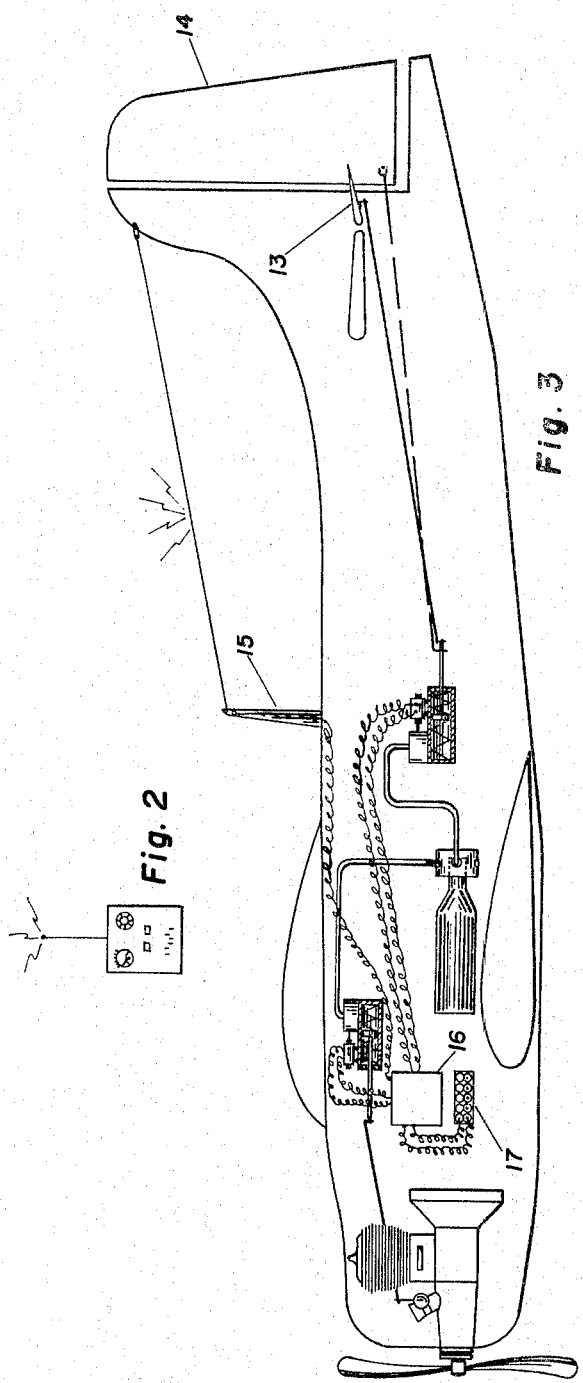
Fig. 3
INVENTOR.
RONALD E. HUFFMAN
BY Arthur C. Baker
ATTY.

Dec. 5, 1967  R. E. HUFFMAN  3,355,838
FLUID PRESSURE CONTROL FOR MODEL AIRCRAFT
Filed June 17, 1965  2 Sheets-Sheet 2

INVENTOR.
RONALD E. HUFFMAN
BY Arthur C. Baker
ATTY.

United States Patent Office 3,355,838
Patented Dec. 5, 1967

3,355,838
FLUID PRESSURE CONTROL FOR MODEL AIRCRAFT
Ronald E. Huffman, Tucson, Ariz. (Box 443, Fries, Va. 24330)
Filed June 17, 1965, Ser. No. 464,764
1 Claim. (Cl. 46—78)

This invention relates to remotely controlled models such as radio-controlled model aircraft, and more particularly relates to an improved system for the remote control of the operation and maneuvering of models such as model aircraft. The invention is shown herein as embodied in an improved system involving actuating and operating the controls of radio-controlled model aircraft by gas pressure.

It is of course well known in the art to operate and control model aircraft from a point remote from the model aircraft, by employing a radio transmitter at the remote point to send control signals; by providing a receiver carried by the model to be controlled, to receive the signal; and by providing a number of servomechanisms, interconnected electrically with the receiver, and interconnected mechanically with various aircraft control levers, to respond and actuate and operate the controls, as commanded from the remote point.

Further, the above described system involving the use of servomechanisms to perform the important function of actuating and operating the various controls may be designed to operate fairly satisfactorily. However, in order to provide for a high degree of refinement in response in actuating and operating each control, servomechanisms which are employed have become very refined, and as a consequence are expensive. When it is realized that several and perhaps many such expensive servomechanism devices may be required to operate a single model, it is obvious that a control system which does not employ servomechanisms would be a considerable improvement in the art, from an economic point of view.

Also, servomechanisms are not entirely satisfactory, when flying or other conditions are encountered which require that considerable force or thrust be applied to operate the levers on the aircraft controls. And, consequently, a control system which does not employ servomechanisms, but does provide a means whereby sufficient force and thrust to operate the controls may be available at all times would be a considerable improvement in the art, from a mechanical point of view.

It is accordingly a primary object of the invention to provide an improved system for the radio control of models such as model aircraft.

It is a further object to provide an improved system for the radio control of models such as model aircraft which does not necessitate the use of servomechanisms.

It is also an object of the invention to provide an improved system for the radio control of models such as model aircraft, which is more economical to manufacture and install than such systems which employ servomechanisms.

It is a further object of the invention to provide an improved system for the radio control of models such as model aircraft wherein the controls are actuated and operated by gas pressure.

It is also an object of the invention to provide an improved system for the radio control of models such as model aircraft having a gas actuator to provide greater thrust to actuate and operate the controls of such aircraft than such systems which employ servomechanisms.

In general, it is contemplated that this improved system for the remote control of models such as model aircraft may include a radio signal transmitter to transmit signals to an aircraft to be maneuvered; a radio signal receiver which may be carried by the aircraft, to receive the signals; a container of gas under pressure which may be carried by the aircraft to provide motive force for the actuation and operation of the aircraft controls; and a gas actuator having a solenoid responsive to receiver signals, and being mechanically linked to the aircraft controls, which may be carried by the aircraft to direct and employ gas under pressure to actuate and operate the aircraft controls.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention.

In the drawings:

FIG. 1 is a fragmentary diagrammatic top plan view of a model airplane partly broken away, to illustrate the invention, and particularly to illustrate the positioning of certain components within the body portion of the airplane;

FIG. 2 is a diagrammatic side elevational view of a radio signal transmitter;

FIG. 3 is a fragmentary diagrammatic side elevational view similar to FIG. 1, to further illustrate the details of the invention;

Figure 4:
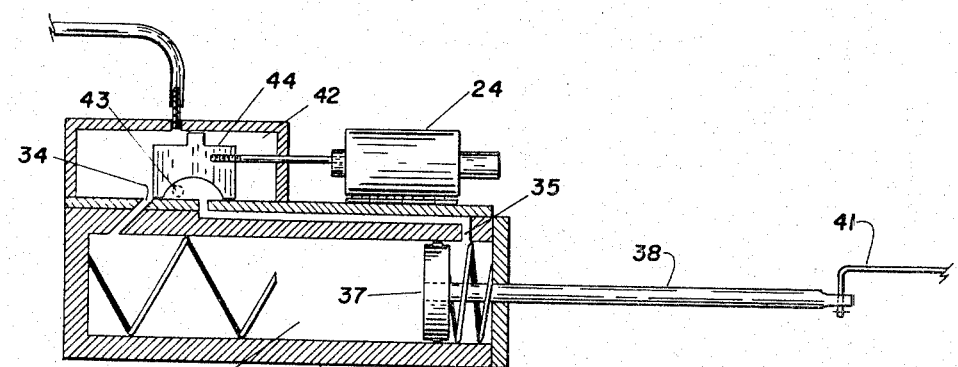
FIG. 4 is a diagrammatic side view of the control actuator showing the manner in which the piston arm of the actuator may be brought to a fully extended position.

Referring now to the drawings one form of the invention is shown in FIGS. 1, 2, and 3, and therein the body to be controlled is assumed for purposes of illustration to be a model airplane designated as 10, although it is to be understood that the invention is equally applicable to any form of model to be controlled.

In the system shown a model airplane body 11 houses an engine 12, and has attached to its rear portion a horizontally disposed elevator 13 and a vertically disposed rudder 14, and the following description will relate to but not be limited by a description of the manner in which these control members may be actuated and operated in accordance with the invention.

Located remotely to the airplane is a radio signal transmitter, illustrated in FIG. 2, and affixed to the top of the airplane body is a radio receiving antennae 15.

As particularly illustrated in FIG. 3, the antennae 15 is interconnected electrically in the manner shown with a radio signal receiver 16, which in turn is interconnected to a battery or other like power supply 17. Up to this point the system does not differ greatly from existing control systems which employ servomechanisms to actuate and operate the controls of models such as model aircraft.

However, in this illustrative embodiment of the invention three gas actuators designated at 18, 19, and 21 may be provided, and each gas actuator may include a conventional self-neutralizing solenoid, the solenoids for each actuator shown being designated as 22, 23, and 24; and each solenoid may be supplied with power from power supply 17 in a manner believed to be fully illustrated in FIGS. 1 and 3.

Figure 5:
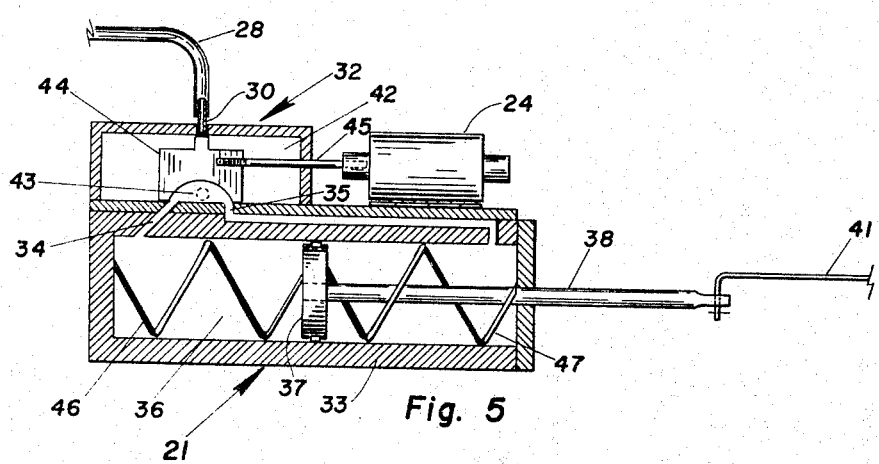
FIG. 5 is a diagrammatic side view of the control actuator showing the manner in which the piston arm of the actuator may be brought to a neutral position.
Figure 6:
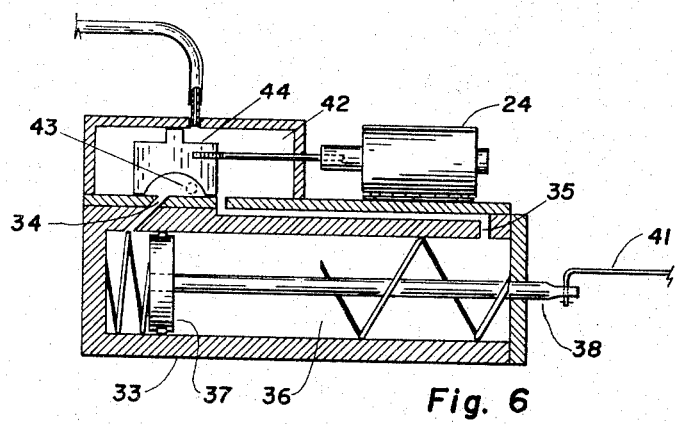
FIG. 6 is a diagrammatic side view of the control actuator showing the manner in which the piston arm of the actuator may be brought to a fully retracted position.

To provide motive power for the operation of the gas actuators a container of compressed gas such as that illustrated at 20 may be provided, and motive gas may be distributed to the several actuators first through manifold 25, and thence through conduits 26, 27, and 28 to gas control valves 29, 31, and 32, which are associated with their respective gas actuators in a manner which is particularly illustrated in FIGS. 4, 5, and 6.

Referring now to FIGS. 4, 5, and 6, the gas actuator 21 may include a closed tubular member 33 which may be provided with two inlet-outlet openings 34 and 35, and tubular member 33 may have an inside diameter to form a chamber 36, to permit the reciprocation of a piston member 37, which may be carried on a piston arm 38. As illustrated clearly in FIG. 1, the piston arm 38 may be interconnected to a lever arm 39 for operation of the elevator 13 through a linkage member 41. Two coil springs such as shown at 46 and 47 may be provided, to maintain piston member 37 in a neutral position, as will be more particularly described.

As shown particularly in FIGS. 4, 5, and 6 gas control valve 32 may include a valve chamber 42 which may be provided with a gas inlet opening member 30, to receive conduit 28, and an exhaust opening 43, for a purpose to be more particularly described. The control valve 32 may also include a valve body 44, and an associated valve shaft 45, which may be interconnected in the manner shown with the solenoid 24.

To illustrate the operation of the system, it may be assumed that the elevator 13 is in a neutral position with the plane in level flight, and that a radio signal is transmitted directing the aircraft to climb. The signal will be received by receiver 16 and will immediately be imposed on solenoid 24, which will respond bp positioning valve body 44 as shown in FIG. 4. In this position the opening 34 becomes an inlet opening to allow compressed gas to enter and opening 35 becomes an outlet opening to allow gas to exhaust into valve chamber 42 and to exhaust to atmosphere through exhaust opening 43. As a consequence piston member 37 and piston arm 38 move from the position of FIG. 5 to the position of FIG. 4, and in turn lever arm 39 is operated through linkage 41 to incline the elevator upwardly and thus cause the aircraft to climb.

To cause the aircraft to descend from a level flying attitude represented by position of the actuator in FIG. 5, the solenoid 24 responds by positioning valve body 44 as shown in FIG. 6. In this position the opening 35 becomes an inlet opening to allow compressed gas to enter and opening 34 becomes an outlet opening to allow gas to exhaust into valve chamber 42 and to exhaust to atmosphere through exhaust opening 43. As a consequence piston member 37 and piston arm 38 move from the position of FIG. 5 to the position of FIG. 6, and in turn lever arm 39 is operated through linkage 41 to incline the elevator 13 downwardly and thus cause the plane to descend.

If the aircraft is climbing or diving, the aircraft may be caused to level off simply by discontinuing control signals at the transmitter. The self-neutralizing solenoid will reposition valve body 44 as shown in FIG. 5. In this reposition opening 34 and opening 35 both become outlet openings to allow gas to exhaust into valve chamber 42 and exhaust to atmosphere through exhaust opening 43. As a consequence the action of coil spring 46 or 47 will cause piston member 37 and piston arm 38 to move from the position of FIG. 4 or FIG. 6, depending on the initial attitude of the aircraft, to the position of FIG. 5, and in turn lever arm 39 will be operated through linkage 41 to position the elevator 13 in a neutral position, and thus cause the aircraft to assume a level attitude. This level attitude may then be maintained through the balancing action of the springs 46 and 47 on piston member 37.

From the drawings it is believed to be clear that the response of the solenoids 22 and 23 will also be effective to initiate operation of the gas actuators 18 and 19, and thus actuate and operate the rudder and engine controls in a similar manner to the actuation and control of the elevator 13, which has been described in detail.

It should also be noted that the provision of a self-neutralizing solenoid is a most effective means for maintaining the aircraft in a neutral command position without further signals.

While the present invention has been disclosed in connection with a specific embodiment thereof, it is to be understood that these are by way of example rather than by way of limitation, and that the invention is to be defined by the attendant claims which should be given a scope as broad as is consistant with the prior art.

What is claimed is:

An apparatus for the remote control of a powered model aircraft having a number of discrete maneuvering control means comprising a radio signal transmitter to transmit control signals to said aircraft; a radio signal receiver, carried by said aircraft, to receive said control signals; a container of gas under pressure carried by said aircraft to provide motive force for the actuation and operation of said maneuvering control means of said aircraft; and a number of discrete gas actuators, each of said gas actuators having a piston chamber to carry a reciprocating piston with a shaft linked to one of said discrete maneuvering control means, a gas control valve to control flow of gas into said piston chamber from said container and out of said piston chamber to atmosphere, means providing fluid communication between said containers and said control valve, and a self-neutralizing solenoid to respond to said control signals and operate said gas control valve in response thereto.

References Cited
UNITED STATES PATENTS

| 2,599,484 | 6/1952 | Rhodes | 46—76 |
| 2,903,822 | 9/1959 | Reid | 46—244 |

LOUIS G. MANCENE, *Primary Examiner.*

F. BARRY SHAY, *Examiner.*

R. F. CUTTING, *Assistant Examiner.*